Patented Dec. 24, 1935

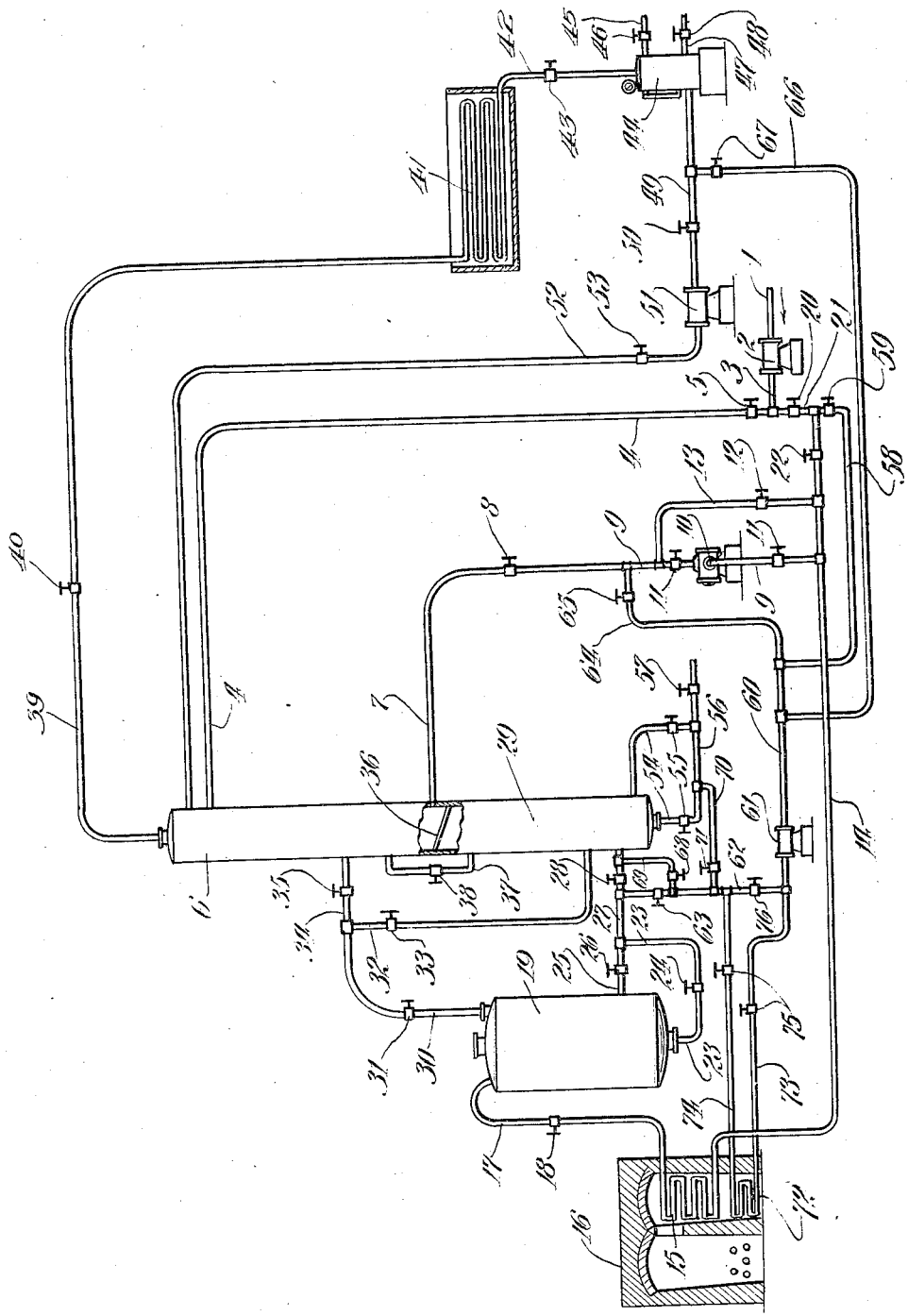

2,025,500

UNITED STATES PATENT OFFICE 2,025,500

PROCESS FOR TREATING HYDROCARBONS

Carbon P. Dubbs, Wilmette, Ill., assignor to Universal Oil Products Company, Chicago, Ill., a corporation of South Dakota Application January 17, 1927, Serial No. 161,486

5 Claims. (Cl. 196—58)

This invention relates to improvements in a process and apparatus for hydrocarbon oil conversion whereby maximum yields of low boiling point oils are obtained with a minimum production of objectionable, heavy, coke-like materials.

In the conversion of petroleum oils under heat and superatmospheric pressure a portion of the material treated is transformed into heavy coke-and-pitch-containing residue, and into solid coke.

Among the advantages and objects of this invention are to provide a process and apparatus in which all the products of reaction formed in the treatment are preferably subjected to a cooling action before the transformation of the material has been carried out to the extent of producing a substantial amount of coke; to provide a process of the character described, in which the heat contained in the material undergoing reaction, after it has been brought up to cracking temperature, is withdrawn from the heated hydrocarbons, thus preventing this high heat from remaining in the oil to cause the formation of excessive amounts of coke; to provide a process wherein the pitch-like material contained in the products of reaction, and more particularly in the heavier fractions formed, is dissolved and kept in solution therein by the addition of a solvent oil to these portions of the product; to provide for a process wherein the lighter products of reaction can be used as liquid solvents of the heaviest portions to prevent formation of excessive amounts of coke and to improve the quality of the residue.

Briefly, the process of the present invention comprises passing the oil through heating tubes wherein it is subjected to the proper conversion temperature, and from which it is discharged into an enlarged reaction chamber. The products of reaction are withdrawn through one or more outlets from this reaction chamber and passed to a vapor separating chamber and dephlegmator where separation of the vapors will take place, followed by the usual reflux condensing action of the vapors evolved. The material withdrawn from the reaction chamber is cooled in a suitable manner before being introduced into the vapor separating chamber. The vapors remaining uncondensed after passage through the dephlegmator may be condensed and collected in the usual way, while the reflux condensate may be returned for further treatment. The heavy unvaporized residue may be withdrawn from the lower end of the vapor separator and passed to suitable storage. The reflux condensate is maintained in the process in a separate body from the unvaporized residue and heavy condensate fractions.

This process is susceptible of wide variations of temperatures and pressures used according to the quality of the material treated and of that of the final products desired.

Also, there are various methods of accomplishing the above objects, and this invention covers broadly all the various methods. In the following description there is set forth an economical and practical method and apparatus suitable for accomplishing these objects, but it will be understood that the particular apparatus shown can be widely changed, and still be within the principle taught in this invention.

In the drawing the single figure is a side elevational schematic or diagrammatic view, partly in vertical section, of an apparatus in which the process may be carried out. The relative sizes of the various parts of the apparatus, suitable for the operation desired, can be fully calculated by those versed in the art.

Referring to the drawing, and illustrating a method by which the purposes of the present invention may be carried out, the oil to be treated may be withdrawn from any suitable source of supply (not shown), passing through line 1, pump 2, line 3, into line 4, controlled by valve 5, line 4 discharging into the upper end of dephlegmator 6. This oil, together with the condensate produced in said dephlegmator, may be withdrawn through the line 7, controlled by valve 8, and, if desired, may be passed through line 9 into the pump 10, controlled by valves 11. Or, if desired, pump 10 can be by-passed by closing valve 11, and opening valve 12 on by-pass line 13. From the pump 10 the oil passes through line 14 into cracking tubes 15, mounted in the furnace 16, which may be of any desired construction, and heated in any suitable manner (not shown). The oil in its passage through the tubes 15 is brought to the desired temperature, after which it passes through transfer line 17, controlled by valve 18, into an enlarged reaction chamber 19. A portion, or all, of the raw oil can also be directed from pump 2 directly to the feed line 14 without passing through dephlegmator 6, and this is effected by controlling the opening of valve 5 on line 4, or closing it completely, and opening partially or totally valves 20 and 22 on line 21. Line 21 merges with line 9 at the discharge of pump 10.

The oil from reaction chamber 19 can be withdrawn from the lower end of the chamber through line 23, controlled by valve 24, or it can be withdrawn from the side of the reaction chamber through line 25, controlled by valve 26. Lines 23 and 25 merge into line 27, controlled by valve 28, through which the products of reaction are discharged into the vapor separating chamber 29.

If the conditions of operation maintained on the process are such that vapors were formed in chamber 19, these can be withdrawn from the upper end thereof through line 30, controlled by valve 31, and can be then either directed through valve 32, controlled by valve 33, into the vapor line separating chamber 29, or they can be passed out directly through line 34, controlled by valve 35, into dephlegmator 6.

In the particular apparatus shown the dephlegmator 6 and the vapor separating chamber 29 are super-imposed in a single shell, which is divided by partition 36. Other constructions can be adopted, for instance, two separate shells.

Suitable stirring devices and baffling devices can be positioned in vapor separating chamber 29.

The vapors which separate in vapor separating chamber 29 are withdrawn therefrom through line 37, controlled by valve 38, and directed into the lower portion of dephlegmator 6. This dephlegmator can be provided with any suitable fractionating means. The vapors pass upward through dephlegmator 6 and sufficiently cracked portions of said vapors are condensed therein. The condensate produced collects over partition 36, and it may be withdrawn through line 7 and returned to the heating tubes. The vapors remaining uncondensed, after passing through the dephlegmator, pass out through vapor outlet line 39, controlled by valve 40, passing into condenser coil 41, from which the condensed liquid passes through line 42, controlled by valve 43, into receiving drum 44. The uncondensable gas may be discharged through line 45, controlled by valve 46, and the condensed distillate may be withdrawn through line 47, controlled by valve 48. Should the vapors discharging from the upper end of dephlegmator 6 into vapor line 39 be insufficiently cooled to condense the fractions having boiling points higher than desired, then regulated portions of the distillate collected in tank 44 may be pumped through line 49, controlled by valve 50, through pump 51 and line 52, controlled by valve 53 into the upper end of the dephlegmator 6 to insure proper cooling.

Regulated portions of the heavier liquid accumulating in the bottom of the vapor separating chamber 29 can be withdrawn therefrom through lines 54, controlled by valves 55, and line 56, controlled by valve 57, being collected in any suitable storage tank (not shown) after having been preferably cooled down through suitable means (not shown).

As a feature of the invention, the material withdrawn from the reaction chamber 19, through lines 23 or 25, and line 27, is preferably relieved of the high heat which it has been given in coil 15 before said heat has had time to cause the formation of any substantial amount of coke-like material. This is accomplished by introducing into the oil passing through line 27, liquid hydrocarbons having a lower temperature than that of the oil withdrawn from chamber 19. As a feature of this invention, the material introduced for a cooling medium can be a portion of the raw oil charged through pump 2, and this is accomplished by providing line 21 with a branch 58, controlled by valve 59, through which a portion of the cold raw oil passes into line 60, and into pump 61, from where it is discharged into line 62, controlled by valves 76 and 63, which merges with line 27. Or, the material used for a cooling agent can be a portion of the reflux condensate from dephlegmator 6, alone or combined with raw oil according to the method of operation used. In this case feed line 14 is provided with a branch 64, controlled by valve 65, leading a portion of the oil withdrawn from dephlegmator 6 through line 7 into line 60, pump 61 and line 62, as above described. Or, in a similar manner, a portion of the distillate collected in tank 44 can be led through line 66, controlled by valve 67, into line 62 through line 60 and pump 61. Or a mixture of these various materials can be used for injection, by regulating the opening of the valves positioned on the branch lines heretofore described.

While the process can be operated with the same pressure maintained on vapor separating chamber 29 as on reaction chamber 19, it can be operated also by reducing the pressure between chambers 19 and 29 by means of valves 28 and 33, down to or above atmospheric pressure. In the latter method of operation it may be desirable to inject the cooling material into the oil withdrawn from chamber 19, either before or after the pressure is reduced by means of valve 28. This can be effected by means of valve 63 on line 62, which connects with line 27 on the high pressure side of valve 28, or by means of regulating valve 68 on branch line 69, which connects the discharge of pump 61 to the low pressure side of valve 28, on line 27.

While the injection of the cooling material into the products of reaction from chamber 19 may be such as to cause the reaction to stop before substantial proportions of coke-like material is produced there may be formed heavy pitch-like material which would separate out in chamber 29.

As another feature of the invention, the introduction into the material withdrawn from chamber 19 of a cooler and preferably lighter oil, such as reflux from dephlegmator 6, or distillate from tank 44, and even raw oil, will cause this pitchy material to be dissolved in the lighter residual oil which accumulates in chamber 29, and which is withdrawn therefrom. Although the reasons for this are not fully understood it nevertheless results in a beneficial action upon the characteristics of the residuum produced in the process, and this residuum can be more readily used and marketed.

This action can be further extended on the residuum produced in the process by injecting this cooler material as above described into the residuum withdrawn from chamber 29 through lines 54 and this can be accomplished by providing the discharge pump 61 with a branch 70, controlled by valve 71, through which this cooler solvent material is directed into residuum draw-off 56. According to whether the pressure on the residuum draw-off from chamber 29 is controlled by valve 55, or by valve 57, it can be seen from the drawing that the injection of the cooler solvent oil into the residuum withdrawn from chamber 29 is effected either before or after release of the pressure.

As a further feature of the invention, the introduction of the cooler solvent material into the process can be effected concurrently on the oil withdrawn from chamber 19 and directed into chamber 29, and on the residual oil drawn off from chamber 29 and evacuated to storage.

The entire system may be maintained under a uniform superatmospheric pressure of from 50 to 1,000 pounds, more or less, or differential pressures may be maintained between any steps of the process. This reduction of pressure may comprise a reduction down to atmospheric pressure, or sub-atmospheric pressure, it being understood that when operating at sub-atmospheric pressure an exhaust or vacuum apparatus would be used.

It can be readily understood that when the pressure is reduced between chamber 19 and chamber 29 this reduction of pressure causes a reduction in the temperature of the oil passing through lines 23 or 24 and 27, and this assists in the reduction of temperature obtained by the injection of the cooler solvent material into line 27.

Although I contemplate preferably using a portion of the raw oil charged into the process, or a portion of the products made in the process as cooler solvent oil, or a mixture of these liquid materials, it is well within the scope of my invention to inject into the material undergoing treatment in the manner above described any other material suitable to produce the desired results from an extraneous source.

As a further feature of the invention, it may be desirable to regulate the temperature of the material injected into the oil leaving reaction chamber 19, and this can be accomplished for instance by interposing in line 60 or 62 suitable heating coils which can be heated in any desirable manner. In this way the proportion, as well as the temperature, of the material injected can be regulated and this will permit an accurate control of the proportion of vapors allowed to separate in chamber 29, which in turn will control the quality of the liquid separated in said tank.

Such a preheater has been shown, diagrammatically, at 72 positioned in the path of the combustion gases from the cracking furnace 16 and connected to the discharge of pump 61 through lines 73 and 74, controlled by valves 75. The control of the flow of the oil through this preheater is effected by means of valve 76 interposed on line 62 and of valves 75.

Recording devices for the pressures and temperatures and levels in the various parts of the apparatus are to be used for the control of the operation, but have not been shown in the drawing, as it is well within the skill of the operator.

I claim as my invention:

1. A hydrocarbon oil cracking process which comprises heating the oil to cracking temperature under pressure in a heating zone, discharging the heated oil into a vapor separating zone maintained under superatmospheric pressure and separating the same therein into vapors and unvaporized oil, separately removing the vapors and unvaporized oil from said separating zone, dephlegmating the vapors in contact with charging oil for the process thereby forming a mixture of charging oil and reflux condensate, combining with said removed unvaporized oil a sufficient quantity of said mixture to substantially check the cracking reaction in the unvaporized oil to prevent carbon formation in the unvaporized oil, introducing the admixed oils to a flashing zone maintained under lower pressure than said separating zone and effecting substantial vaporization of the admixed oils therein, dephlegmating the resultant vaporous mixture to condense heavier fractions thereof, and supplying condensed heavier fractions to said heating zone.

2. A hydrocarbon oil cracking process which comprises passing the oil in a restricted stream through a heating zone and heating the same therein to cracking temperature under pressure, discharging the heated oil into a reaction zone maintained under cracking conditions of temperature and pressure, separately removing vapors and unvaporized oil from said reaction zone, checking the cracking reaction in the withdrawn unvaporized oil by introducing a cooling oil thereto, passing the thus combined oils to a flashing zone maintained under lower pressure than said reaction zone and effecting vaporization therein by pressure reduction, combining the resultant flashed vapors with the vapors removed from said reaction zone, dephlegmating the admixed vapors in contact with charging oil for the process thereby forming a mixture of charging oil and reflux condensate, utilizing a portion of said mixture as said cooling oil, and supplying the remaining portion of said mixture to the heating zone.

3. In the conversion of higher boiling hydrocarbons into lower boiling ones, the process that comprises maintaining oil in a cracking zone under superatmospheric pressure and at a cracking temperature to effect cracking, dephlegmating evolved vapors to form reflux condensate, withdrawing liquid oil from the cracking zone and reflux condensate from the dephlegmating zone and directing the liquid oil and reflux condensate thus withdrawn without further heating into a dephlegmating and distilling zone maintained under relatively low pressure, subjecting the fluid in the lower pressure dephlegmating and distilling zone to distillation and dephlegmation therein, withdrawing from the lower pressure zone residual oil comprising essentially stripped residuum from the cracking zone, withdrawing reflux condensate from the lower pressure zone and conducting it to the cracking zone.

4. A hydrocarbon oil cracking process which comprises passing the oil in a restricted stream through a heating zone and heating the same therein to cracking temperature under pressure, discharging the heated oil into a vapor separating zone and separating the same therein under pressure into vapors and unvaporized oil, separately removing the vapors and unvaporized oil from said separating zone, fractionating the vapors in contact with charging oil for the process, combining a portion of the resultant mixture of charging oil and reflex condensate, prior to any cracking treatment thereof, with said unvaporized oil, partially distilling the resultant mixture under lower pressure than is maintained on said separating zone thereby vaporizing portions of the charging oil and said unvaporized oil, condensing heavier fractions of the vapors thus evolved, and supplying such condensed heavier fractions and the remaining portion of the mixture of charging oil and reflux condensate to said heating zone.

5. In the conversion of higher boiling hydrocarbons into lower boiling ones, the process that comprises maintaining oil in a cracking zone under superatmospheric pressure and at cracking temperature to effect cracking, withdrawing vapors and liquid oil from the cracking zone and dephlegmating the former to form reflux condensate, directing the withdrawn liquid oil and condensate, including reflux condensate formed by the dephlegmation of the vapors removed from the cracking zone, without further heating into a dephlegmating and distilling zone maintained under relatively low pressure, subjecting the fluid in the lower pressure dephlegmating and distilling zone to distillation and dephlegmation therein, withdrawing from the lower pressure zone residual oil comprising essentially stripped residuum from the cracking zone, withdrawing reflux condensate from the lower pressure zone and conducting it to the cracking zone.

CARBON P. DUBBS.